July 8, 1924.

T. G. DADE 1,500,113

WHEEL

Filed May 14, 1923

INVENTOR
*Thomas G. Dade.*
BY
ATTORNEY

Patented July 8, 1924.

1,500,113

UNITED STATES PATENT OFFICE.

THOMAS G. DADE, OF ST. MARYS, OHIO.

WHEEL.

Application filed May 14, 1923. Serial No. 638,882.

*To all whom it may concern:*

Be it known that I, THOMAS G. DADE, a citizen of the United States, residing at St. Marys, in the county of Auglaize and State of Ohio, have invented certain new and useful Improvements in Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to wheels and particularly to wheels having wooden tires, the primary object of the invention being to provide an improved form of wheel which can be cheaply made and inexpensively assembled.

The tire for the wheel is made up of a plurality of blocks arranged end to end in a circular series, which are then put under pressure to draw them together. They are then held in place by inset rings which maintain the continuity of the blocks in the form of a unitary tire structure. The tire is then adapted to be clamped between two central wheel members consisting of hub portions and web portions integral therewith, on the outer edge of which are tire clamping jaws.

An important feature of the invention is the provision of means for making a wooden block tire as a unitary structure, preparatory to placing it on the wheel.

The invention will be clearly understood by reference to the following description, in connection with the accompanying drawings, in which—

Figure 1:
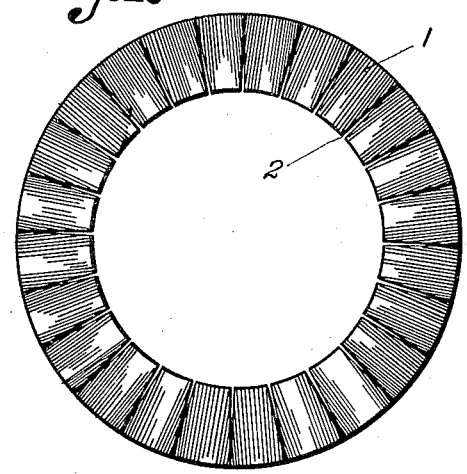
Fig. 1 is an elevational view of a plurality of blocks assembled ready to be put under pressure to draw them together.
Figure 2:
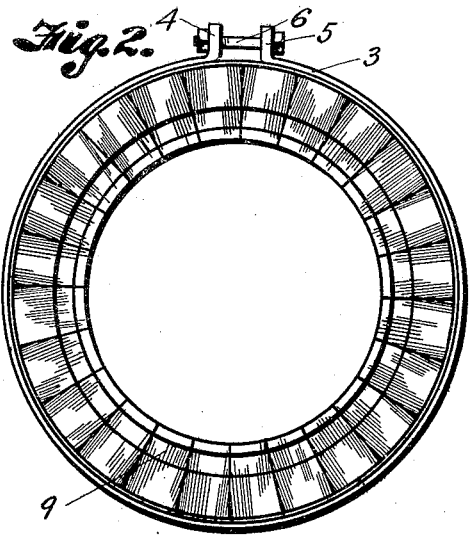
Fig. 2 shows the blocks with a drawing ring about them for drawing them into position.

Referring now to Fig. 1, the blocks 1 are segmental, wedge-shaped blocks, the outer edges of which abut one against the other and the inner edges of the ends being spaced apart as at 2. These blocks are arranged as shown in Fig. 1 and then a clamping ring or drawing ring 3 is placed about them. The two upstanding lugs 4 and 5 of the clamping ring are adapted to receive a bolt 6 which can be drawn so that the ring will exert pressure equally over the respective blocks and draw them tightly together so that the portions forming the spaces 2 will lie one against the other in intimate contact. Then two inset rings 7 and 8 are placed in grooves 9 and 10 in the sides of the tire. The grooves are formed by cutting after the blocks are clamped in the ring 3.

The rings can be fastened to the blocks by screws 11 and 12. The central portion of the wheel consists of two complementary members 13 and 14, each of which has a hub portion; the member 13 has a hub portion 15 and the member 14 has a hub portion 16. The hub portions carry outwardly extending webs 17 and 18, terminating in jaws 19 and 20 which constitute an undercut groove for the reception of the blocks. The meeting edges of the jaws are packed by a packing ring 21 and the two members 13 and 14 are clamped together by bolts 22.

When the rim is formed, it will be only necessary to bring the two members 13 and 14 toward one another on opposite sides of the tire, place the bolts 22 therein, and draw them up tightly, preferably inserting a packing ring 21 between the two members before the bolts are drawn up. The tire will, therefore, be held tightly in place and liability of creeping or loosening will be entirely eliminated.

Figure 3:
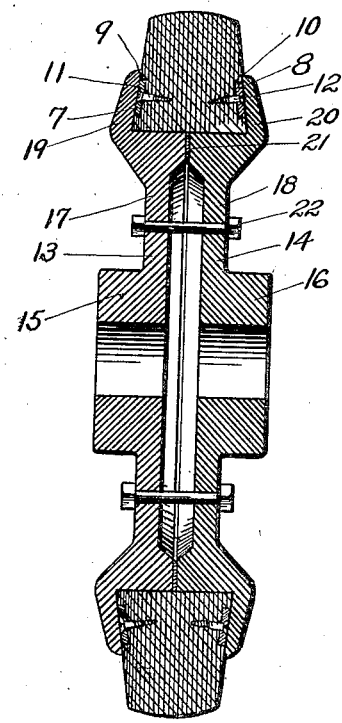
Fig. 3 is a vertical, sectional view through a complete wheel.
Figure 4:
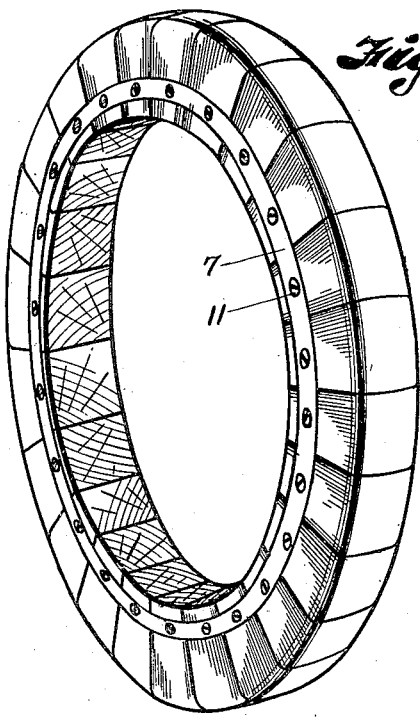
Fig. 4 is a detail perspective view of the wheel tire.

The blocks forming the tire should preferably have the fibers running radially of the wheel as this gives longer wearing life to the wheel and also prevents the blocks from chipping. When the blocks are formed into a tire and then held between the jaws, as shown in Fig. 3, the stresses will be exerted radially rather than sidewise and as a result, the wearing qualities of the tire will be enhanced.

What I claim and desire to secure by Letters-Patent is:

A wheel tire comprising a plurality of wedge-shaped wooden blocks arranged end to end in circular series, flat metallic rings inserted into grooves in opposite faces of the blocks and screws passing through the rings and into the blocks, there being two screws in each block, one entering through a ring on each side of the block.

In testimony whereof I affix my signature.

THOMAS G. DADE.